(12) United States Patent
Dickman et al.

(10) Patent No.: US 6,878,474 B2
(45) Date of Patent: *Apr. 12, 2005

(54) SYSTEM AND METHOD FOR RECOVERING THERMAL ENERGY FROM A FUEL PROCESSING SYSTEM

(75) Inventors: Anthony J. Dickman, Bend, OR (US); David J. Edlund, Bend, OR (US); William A. Pledger, Sisters, OR (US)

(73) Assignee: IdaTech, LLC, Bend, OR (US)

( * ) Notice: Subject to any disclaimer, the term of this patent is extended or adjusted under 35 U.S.C. 154(b) by 243 days.

This patent is subject to a terminal disclaimer.

(21) Appl. No.: 10/266,854

(22) Filed: Oct. 7, 2002

(65) Prior Publication Data

US 2003/0049502 A1 Mar. 13, 2003

Related U.S. Application Data

(63) Continuation of application No. 09/476,963, filed on Jan. 3, 2000, now Pat. No. 6,465,118.

(51) Int. Cl.[7] .............................. H01M 8/04; H01M 8/06
(52) U.S. Cl. .............................. 429/20; 429/22; 429/24; 429/26
(58) Field of Search .............................. 429/17, 19, 20, 429/22, 24, 26

(56) References Cited

U.S. PATENT DOCUMENTS

| 3,765,946 A | 10/1973 | Werner et al. |
|---|---|---|
| 3,857,735 A | 12/1974 | Louis et al. |
| 3,920,416 A | 11/1975 | Houseman |
| 3,955,941 A | 5/1976 | Houseman et al. |
| 3,980,452 A | 9/1976 | Krumm et al. |
| 4,003,343 A | 1/1977 | Lee |
| 4,098,959 A | 7/1978 | Fanciullo |

(Continued)

FOREIGN PATENT DOCUMENTS

| EP | 0434562 A1 | 6/1991 |
|---|---|---|
| GB | 1037423 | 7/1966 |
| WO | WO 99/65097 | 12/1999 |
| WO | WO 00/02282 | 1/2000 |
| WO | WO 00/04600 | 1/2000 |

OTHER PUBLICATIONS

English language abstract of Japanese Patent No. 4-163860, Jun. 1992.
English language abstract of Japanese Patent No. 5-147902, Jun. 1993.
English language abstract of Japanese Patent No. 6176779, Jun. 1994.
English language abstract of Japanese Patent No. 7057758, Mar. 1995.
English language abstract of Japanese Patent No. 8-287932, 11/1996.

(Continued)

*Primary Examiner*—Jonathan Crepeau
(74) *Attorney, Agent, or Firm*—Kolisch Hartwell, P.C.

(57) ABSTRACT

A system and method for recovering thermal energy from a fuel processing system comprising a fuel processor and a fuel cell stack. The system includes a heat recovery system including a heat exchange fluid that recovers thermal energy from such sources as the combustion exhaust from the fuel processor, the cathode chamber exhaust from the fuel cell stack and/or the fuel cell stack directly.

59 Claims, 4 Drawing Sheets

U.S. PATENT DOCUMENTS

| | | |
|---|---|---|
| 4,098,960 A | 7/1978 | Gagnon |
| 4,238,403 A | 12/1980 | Pinto |
| 4,302,177 A | 11/1981 | Fankhanel et al. |
| 4,315,893 A | 2/1982 | McCallister |
| 4,381,641 A | 5/1983 | Madgavkar et al. |
| 4,444,158 A | 4/1984 | Yoon |
| 4,472,176 A | 9/1984 | Rubin |
| 4,473,622 A | 9/1984 | Chludzinski et al. |
| 4,533,607 A | 8/1985 | Sederquist |
| 4,567,857 A | 2/1986 | Houseman et al. |
| 4,583,583 A | 4/1986 | Wittel |
| 4,642,273 A | 2/1987 | Sasaki |
| 4,644,751 A | 2/1987 | Hsu |
| 4,650,814 A | 3/1987 | Keller |
| 4,657,828 A | 4/1987 | Tajima |
| 4,659,634 A | 4/1987 | Struthers |
| 4,670,359 A | 6/1987 | Beshty et al. |
| 4,781,241 A | 11/1988 | Misage et al. |
| 4,788,004 A | 11/1988 | Pinto et al. |
| 4,849,187 A | 7/1989 | Uozu et al. |
| 4,865,624 A | 9/1989 | Okada |
| 4,904,455 A | 2/1990 | Karafian et al. |
| 4,946,667 A | 8/1990 | Beshty |
| 5,030,661 A | 7/1991 | Lywood |
| 5,200,278 A | 4/1993 | Watkins |
| 5,229,222 A | 7/1993 | Tsutsumi et al. |
| 5,335,628 A | 8/1994 | Dunbar |
| 5,344,721 A | 9/1994 | Sonai et al. |
| 5,360,679 A | 11/1994 | Buswell et al. |
| 5,366,821 A | 11/1994 | Merritt et al. |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,478,662 A | 12/1995 | Strasser |
| 5,509,942 A | 4/1996 | Dodge |
| 5,527,632 A | 6/1996 | Gardner |
| 5,631,820 A | 5/1997 | Donnelly et al. |
| 5,637,414 A | 6/1997 | Inoue et al. |
| 5,658,681 A | 8/1997 | Sato et al. |
| 5,677,073 A | 10/1997 | Kawatsu |
| 5,741,474 A | 4/1998 | Isomura et al. |
| 5,763,113 A | 6/1998 | Meltser et al. |
| 5,771,476 A | 6/1998 | Mufford et al. |
| 5,780,179 A | 7/1998 | Okamoto |
| 5,795,666 A | 8/1998 | Johnssen |
| 5,798,186 A | 8/1998 | Fletcher et al. |
| 5,811,065 A | 9/1998 | Sterenberg |
| 5,821,185 A | 10/1998 | White et al. |
| 5,858,314 A | 1/1999 | Hsu et al. |
| 5,861,137 A | 1/1999 | Edlund |
| RE36,148 E | 3/1999 | Strasser |
| 5,897,970 A | 4/1999 | Isomura et al. |
| 5,932,181 A | 8/1999 | Kim et al. |
| 5,985,474 A | 11/1999 | Chen et al. |
| 5,997,594 A | 12/1999 | Edlund et al. |
| 6,007,931 A | 12/1999 | Fuller et al. |
| 6,022,634 A | 2/2000 | Ramunni et al. |
| 6,042,956 A | 3/2000 | Lenel |
| 6,045,933 A | 4/2000 | Okamoto |
| 6,054,229 A | 4/2000 | Hsu et al. |
| 6,077,620 A | 6/2000 | Pettit |
| 6,103,411 A | 8/2000 | Matsubayashi et al. |
| 6,120,923 A | 9/2000 | Van Dine et al. |
| 6,165,633 A | 12/2000 | Negishi |
| 6,171,574 B1 | 1/2001 | Juda et al. |
| 6,187,066 B1 | 2/2001 | Benz et al. |
| 6,190,623 B1 | 2/2001 | Sanger et al. |
| 6,221,117 B1 | 4/2001 | Edlund et al. |
| 6,465,118 B1 * | 10/2002 | Dickman et al. ............ 429/20 |

OTHER PUBLICATIONS

English language abstract of German language PCT Patent Application Ser. No. WO 00/04600, 1/2000.

Adris, A. M., et al., "A Fluidized Bed Membrane Reactor for the Steam Reforming of Methane," The Canadian Journal of Chemical Engineering, vol. 69, pp. 1061–1070 (Oct. 1991).

Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22–25, 1997).

Edlund, David J. and William A. Pledger, "The Practical Use of Metal–Membrane Reactors for Industrial Applications," The 1995 Membrane Technology Reviews, pp. 89–97 (Nov., 1994).

* cited by examiner

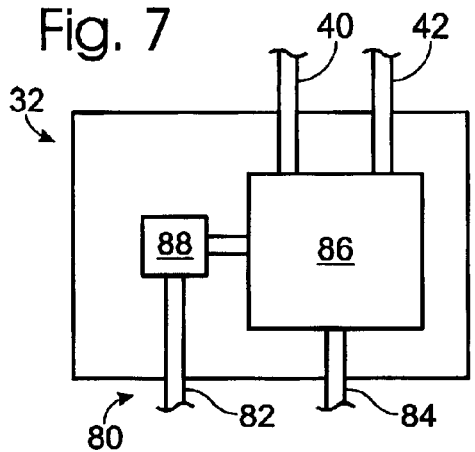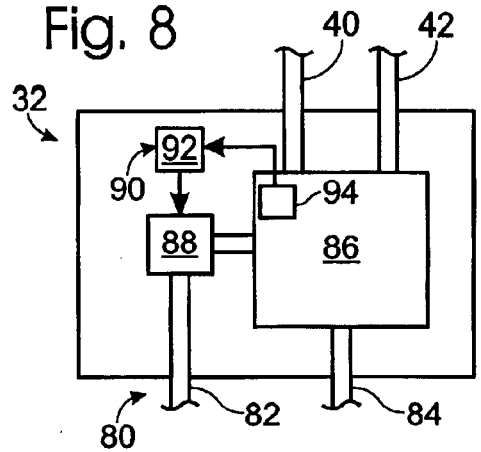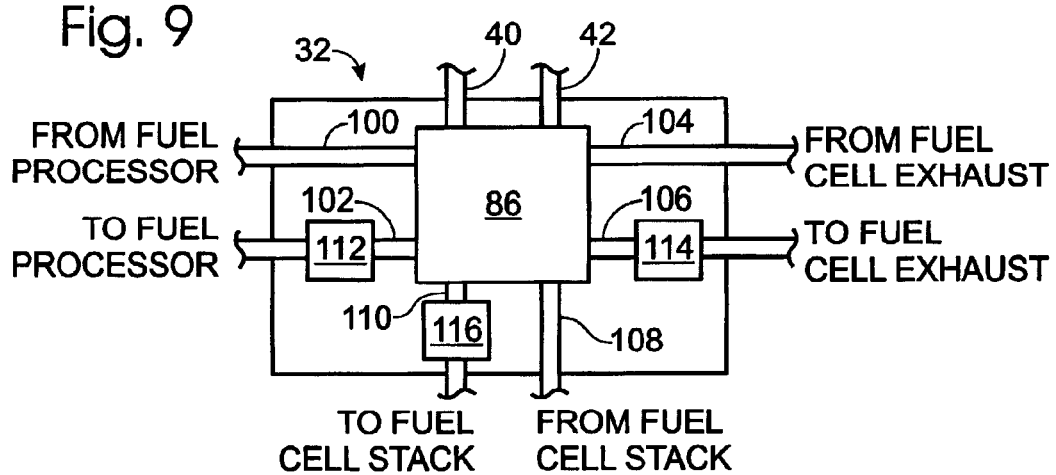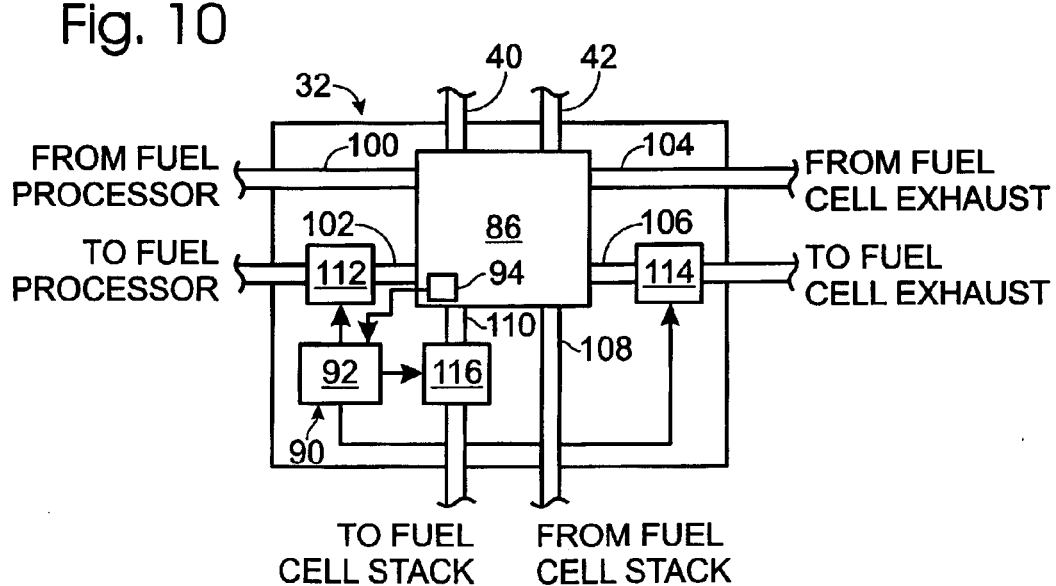

SYSTEM AND METHOD FOR RECOVERING THERMAL ENERGY FROM A FUEL PROCESSING SYSTEM

RELATED APPLICATION

This application is a continuation of and claims priority to U.S. patent application Ser. No. 09/476,963, which was filed on Jan. 3, 2000, issued on Oct. 15, 2002 as U.S. Pat. No. 6,465,118, is entitled "System and Method for Recovering Thermal Energy from a Fuel Processing System," and the complete disclosure of which is hereby incorporated by reference for all purposes.

FIELD OF THE INVENTION

The present invention relates generally to fuel processing systems, and more particularly to a system and method for harvesting the thermal energy produced by the fuel processing system.

BACKGROUND AND SUMMARY OF THE INVENTION

Fuel processing systems include a fuel processor and a fuel cell stack. Fuel processors produce hydrogen gas from a feedstock. One type of fuel processor is a steam reformer, which reacts steam with an alcohol or hydrocarbon at an elevated temperature to produce a product stream containing hydrogen gas. The product stream is delivered to the fuel cell stack, which produces an electric current therefrom. This electric current can be used to satisfy the electric load of an associated energy-consuming device, such as a household, vehicle, boat, generator and the like. A byproduct of producing the electric current is heat, which is formed when protons liberated from the hydrogen gas in the anode chamber of a fuel cell react with electrons and oxygen in the cathode chamber to form water.

Besides being able to satisfy the electrical demands of the associated device, the fuel processing system also provides a harvestable source of thermal energy. For example, heat may be harvested from the fuel cell stack directly, or from the exhaust from the fuel cell stack's cathode chamber. If the fuel processor utilizes a combustion region to maintain the processor within selected elevated temperature ranges, the exhaust from this combustion region may also be tapped to harvest thermal energy.

Therefore, a fuel processing system offers several avenues for recovering thermal energy that otherwise would be lost. The present invention provides a system and method for not only recovering thermal energy from the fuel processing system, but also maintaining and controlling the utilization of this recovered thermal energy to meet the thermal loads of one or more associated devices.

Many other features of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 7 is a schematic diagram of an embodiment of the thermal energy reservoir of FIGS. 1–3.

FIG. 8 is a schematic diagram showing a variation of the thermal energy reservoir of FIG. 7.

FIG. 9 is a schematic diagram of an embodiment of the thermal energy reservoir of FIG. 6.

FIG. 10 is a schematic diagram of a variation of the thermal energy reservoir of FIG. 9.

DETAILED DESCRIPTION AND BEST MODE OF THE INVENTION

Figure 1:
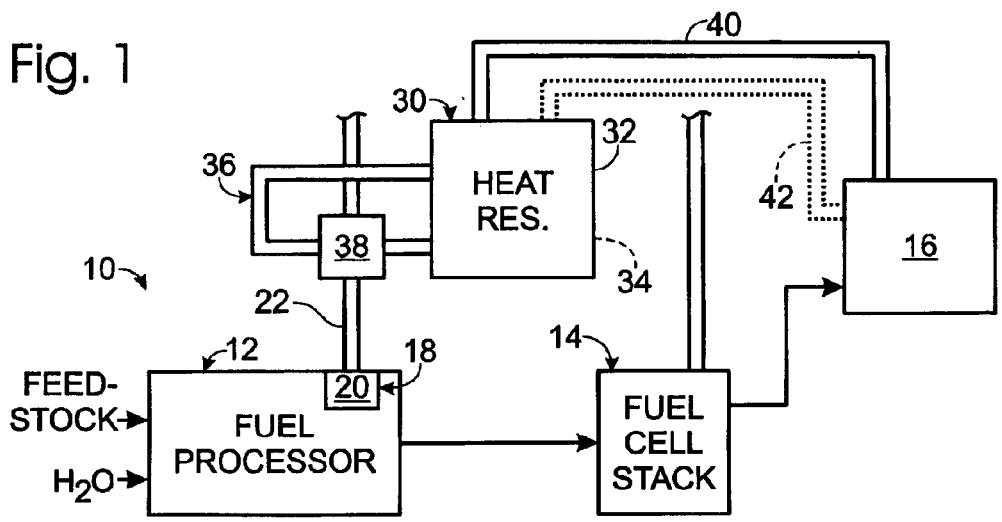
FIG. 1 is a schematic diagram of a fuel processing system according to the present invention adapted to recover thermal energy from an exhaust stream of a fuel processor.

A fuel processing system is shown in FIG. 1 and indicated generally at 10. System 10 includes a fuel processor 12 and a fuel cell stack 14. Fuel processor 12 produces hydrogen gas from water and a reforming feedstock, typically comprising an alcohol or a hydrocarbon. The hydrogen gas is used by the fuel cell stack to produce an electric current, as will be discussed in more detail subsequently. The current may be used to meet the electric loads applied by an associated electrical device 16, such as a vehicle, boat, generator, household, etc.

It should be understood that device 16 is schematically illustrated in the Figures and is meant to represent one or more devices adapted to receive electric current from the fuel processing system. Furthermore, the fuel processing system described herein has been schematically illustrated to include the principle components of the system, namely fuel processor 12, fuel cell stack 14, and the thermal energy recovery system disclosed herein. It should be understood that the fuel processing systems described herein may include additional components, such as disclosed in copending U.S. patent application Ser. No. 09/190,917, now U.S. Pat. No. 6,376,113, the disclosure of which is hereby incorporated by reference. Other suitable fuel processors with which the present invention may be implemented include other steam reformers, or fuel processors that produce hydrogen by partial oxidation of a hydrocarbon or alcohol vapor, or by a combination of partial oxidation and steam reforming a hydrocarbon or an alcohol vapor, or by pyrolysis of a hydrocarbon or alcohol vapor.

Fuel processor 12 normally operates at an elevated temperature and is maintained within selected temperature ranges by a heating assembly 18. In many fuel processors, the heating assembly includes a combustion region 20 in which a fuel is combusted to produce the heat required to maintain the fuel processor within the desired temperature range. A variety of fuels may be used, including hydrogen gas produced by the fuel processor, propane or other flammable gases, combustible liquid fuels, etc. When heating assembly 18 includes a combustion region 20, it will also include an exhaust stream 22 from which the hot gases from the combustion region are expelled from the fuel processor.

This exhaust stream may be tapped to harvest, or recover, the thermal energy of the gases contained within.

In FIG. 1 an embodiment of a thermal energy recovery system is shown and generally indicated at 30. System 30, which may also be referred to as a heat reservoir system or heat recovery system, is adapted to recover at least a portion of the heat capacitance of the fuel processing system. As used herein "heat capacitance" is meant to refer to the thermal energy of the system that would otherwise not be recovered.

System 30 includes a heat reservoir 32 that is configured to store the recovered thermal energy. Reservoir 32 includes a heat exchange fluid 34 that flows through a heat exchange loop 36 that includes a heat exchanger 38. In heat exchanger 38, through which exhaust stream 22 also passes, the heat exchange fluid is heated by the hotter exhaust stream. Plate-type heat exchangers have proven effective, although it is within the scope of the present invention that any suitable form of heat exchanger may be used.

Heat exchange fluid 34 may be any suitable fluid capable of being heated by one of the sources of thermal energy described herein. Examples of suitable heat exchange fluids include air, water, glycols, and water-glycol mixtures, although other suitable fluids may be used, depending upon the particular operating conditions and requirements of the particular system and the environment in which it is used. For example, glycol and glycol-water fluid systems may be preferred when the fuel processing system is used in environments where freezing temperatures are encountered. When water is used, it may be desirable to use deionized water such as when purified water is required, however, in other systems potable water may be used, and even consumed, by the associated device.

Fluid 34 may be passed through the heat exchange loop only a single time, or the fluid may be recycled through the loop multiple times, or even continuously. When a once-through cycle is used, the heated fluid may be transported directly to device 16, instead of initially returning to reservoir 32, as shown in FIG. 1. In most applications, it will be desirable to have a continuous recycle of the heat exchange fluid, with a larger volume of heated fluid stored in the reservoir and maintained within selected temperature ranges by recycling the fluid through loop 36.

When it is desirable to use the heated fluid to meet the thermal load applied by device 16, or any other thermal energy consuming device or devices, the desired flow of fluid 34 may be pumped or otherwise transported to the device, such as through conduit 40. In some applications, the transported fluid will be consumed at the device. In others, it will return to reservoir 32 via conduit 42 after being used to provide heating at device 16.

Examples of situations where the fluid will be consumed at device 16 include embodiments where water is the heat exchange fluid. This heated water may be used to provide some or all of the hot water needs of the device. For example, if device 16 includes one or more households, thereby including one or more showers, dish washers, clothes washers, sinks, etc., the required hot water may be provided by system 30. In some applications, the heated water delivered by system 30 may be provided at the desired temperature for use by device 16. In others, it may be delivered at a preheated temperature that is lower than the desired temperature and then heated to the desired temperature at device 16, such as by a water heater. When air is the heat exchange fluid, the heated air may be pumped to device 16 to provide heating thereto. Air will typically be a once-through heat exchange fluid, in that it will typically pass through heat exchanger 38 and then be delivered directly to device 16. As discussed, other heat exchange fluids may be used as well, depending on the particular needs of device 16.

Water may also be used for heating at device 16 and then returned to system 30. Similarly, fluid systems containing glycols or other fluids that are harmful to humans will typically be used for heating and then recycled to system 30. When a system containing a glycol or other fluid that is not consumed at device 16, this fluid may be recycled through device 16 to provide heating thereto, or it may be used to heat a fluid, such as air or water, that is consumed at device 16.

Figure 2:
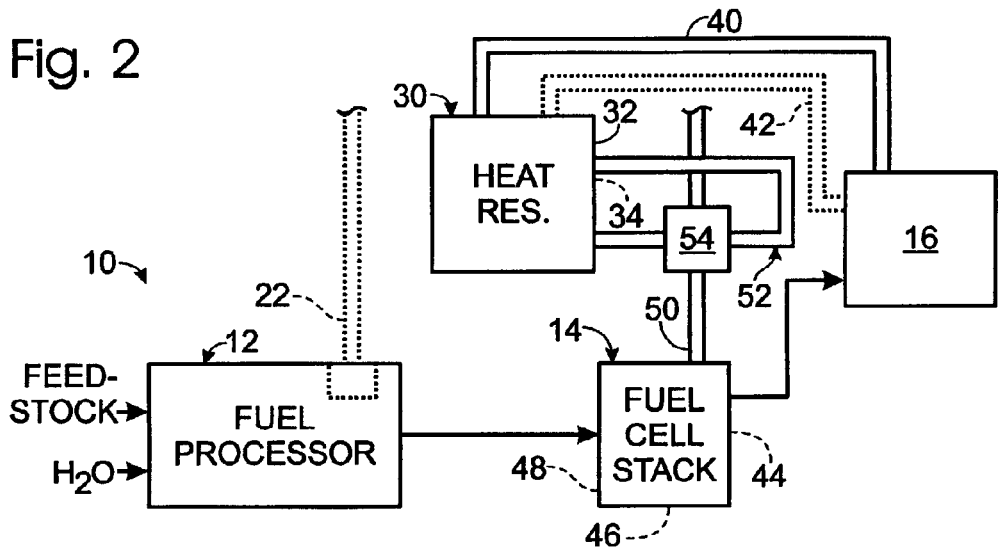
FIG. 2 is a schematic diagram of another embodiment of the fuel processing system of FIG. 1 adapted to recover thermal energy from a cathode chamber exhaust stream of a fuel cell stack.

Another embodiment of the heat recovery system is schematically illustrated in FIG. 2. In this embodiment, system 30 is adapted to recover thermal energy from an exhaust stream from the cathode chamber of fuel cell stack 14. Fuel cell stack 14 includes one or more fuel cells adapted to produce an electric current from the hydrogen gas produced by the fuel processor. An example of a suitable fuel cell is a proton exchange membrane (PEM) fuel cell, in which hydrogen gas is catalytically dissociated in the fuel cell's anode chamber 44 into a pair of protons and electrons. The liberated protons are drawn through an electrolytic membrane 46 into the fuel cell's cathode chamber 48. The electrons cannot pass through the membrane and instead must travel through an external circuit to reach the cathode chamber. The net flow of electrons from the anode to the cathode chambers produces an electric current, which can be used to meet the electrical load being applied by device 16. In the cathode chamber, the protons and electrons react with oxygen to form water and heat. This heat, or thermal energy, is exhausted from the fuel cell stack through an exhaust stream 50. It is within the scope of the present invention that any other suitable type of fuel cell may be used. For example, alkaline fuel cells may be used.

As shown in FIG. 2, system 30 may harvest the thermal energy of exhaust stream 50 via a heat exchange loop 52 and heat exchanger 54. Similar to the embodiment of system 30 shown in FIG. 1, heat exchange fluid 34 is pumped through loop 52. The cooler heat exchange fluid is heated by the hotter exhaust stream 50 in heat exchanger 54. The heated fluid is returned to reservoir 32, where it may be used to satisfy the thermal demands of device 16, such as through conduit 40.

Figure 3:
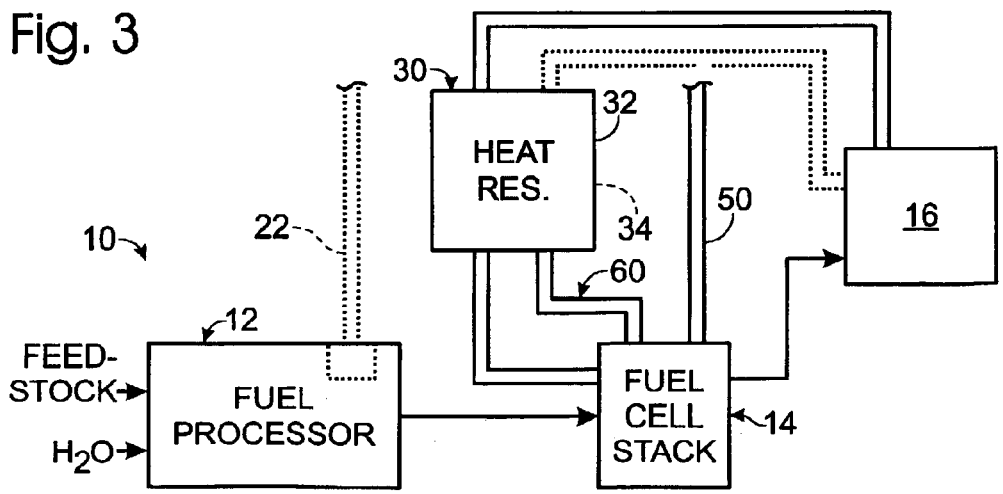
FIG. 3 is a schematic diagram of another embodiment of the fuel processing system of FIG. 1 adapted to recover thermal energy from the fuel cell stack directly.

As shown in FIG. 3, heat recovery system 30 may also be adapted to harvest thermal energy from fuel cell stack 14 directly. As discussed, fuel cell stack 14 is typically comprised of multiple fuel cells that are coupled together to collectively produce sufficient current to satisfy the electrical loads of device 16. The number of such cells is typically selected based on the available size of the stack and the current required by the device. For example, fuel processing systems implemented on vehicles will typically need to occupy less space and have less available weight than systems implemented for use in a household. In FIG. 3, a heat exchange loop 60 is shown transporting heat exchange fluid 34 through fuel cell stack 14.

Figure 5:
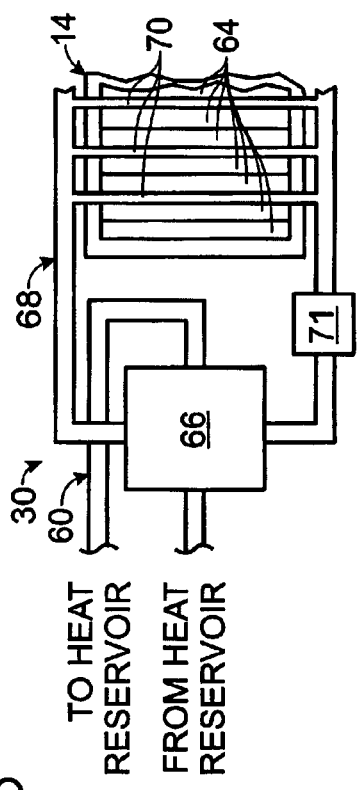
FIG. 5 is the diagram of FIG. 4 showing another embodiment of the thermal recovery system and fuel cell stack.
Figure 4:
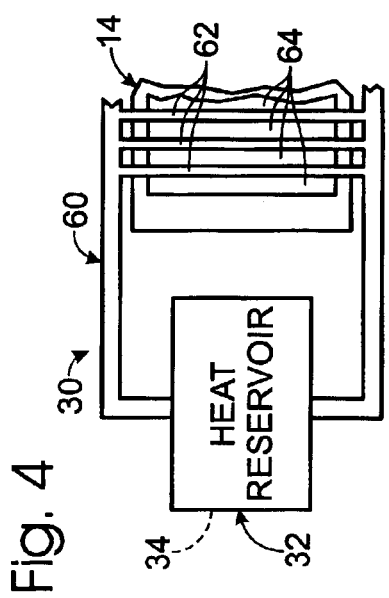
FIG. 4 is an enlarged fragmentary diagram schematically illustrating a portion of the thermal energy recovery system and fuel cell stack of FIG. 3.

In FIGS. 4 and 5, two examples of heat exchange loops are shown for recovering thermal energy directly from fuel cell stack 14. In FIG. 4, heat loop 60 includes a plurality of conduits 62 that flow between the fuel cells 64 comprising fuel cell stack 14 to recover thermal energy therefrom. In FIG. 4, conduits 62 are shown passing between each fuel cell 64, however, it should be understood that conduits 62 do not necessarily pass between every adjacent fuel cell 64. For example, the conduits may pass between every other fuel cell, every third fuel cell, etc., depending upon such factors as user preferences, thermal management within the fuel cell stack, the size of the conduits, the available thermal energy in stack 14, etc.

FIG. 5 also schematically illustrates the use of an intermediate heat exchange loop. As shown, heat exchange loop 60 from reservoir 32 does not directly pass through fuel cell stack 14. Instead, it passes through a heat exchanger 66, through which another heat exchange loop 68 also passes. Loop 68, which may also be referred to as an intermediate heat exchange loop, includes conduits 70 that pass between selected fuel cells to recover thermal energy therefrom. As shown, conduits 70 pass between every second fuel cell, but as discussed, the specific spacing of the cells and conduits may vary. Heat exchange fluid is circulated through intermediate heat exchange loop by a pump assembly 71 that includes one or more pumps adapted to pump the particular heat exchange fluid in loop 68.

An intermediate heat exchange loop may be desirable if there is a concern that metal ions may be introduced into the fuel cell stack through the heat exchange fluid 34. As a step to prevent this from occurring, it may be desirable to use a closed, or sealed, intermediate heat loop filled with a heat exchange fluid such as deionized water. The heat recovered by this closed loop can then be transferred to another heat exchange loop, such as loop 60, which contains the heat exchange fluid used in reservoir 32. Another example of when such an intermediate heat exchange loop may be desirable is when the heat exchange fluid contains glycols or other non-potable substances.

Figure 6:
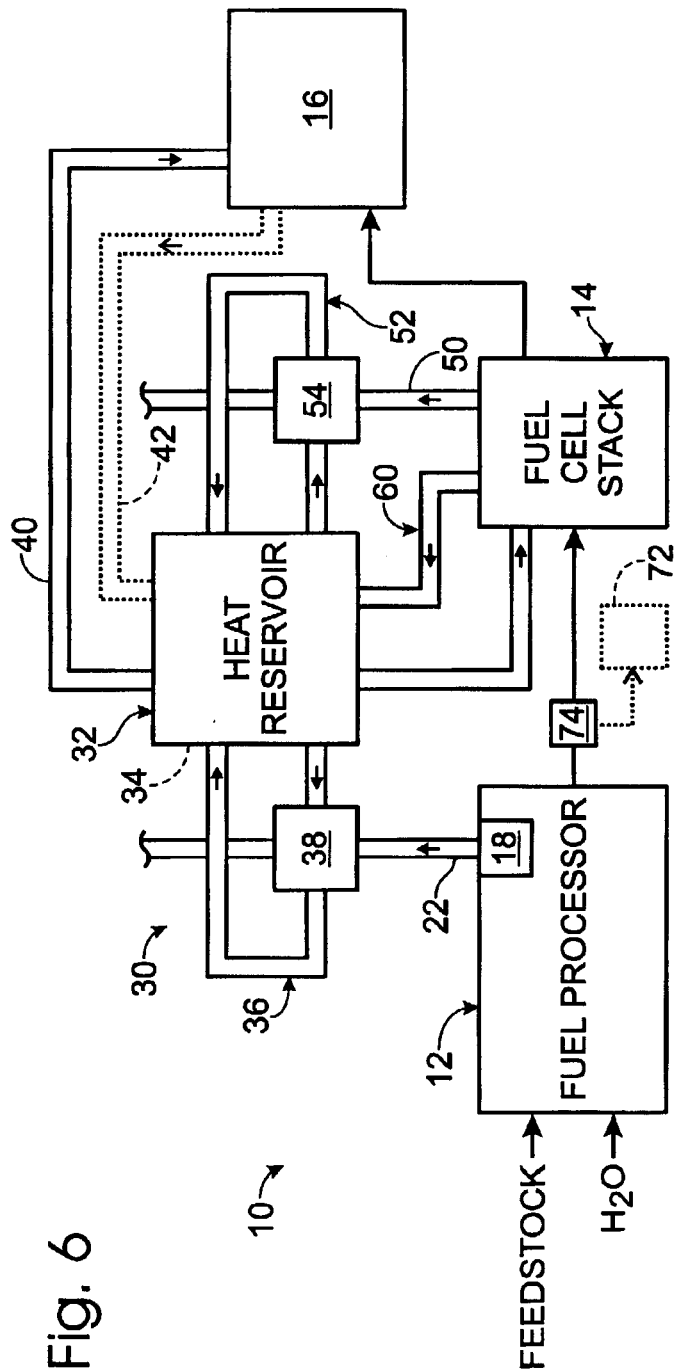
FIG. 6 is a schematic diagram of a fuel processing system according to the present invention that includes the thermal energy recovery system of the embodiments of FIGS. 1–3.

It should be understood that the invented thermal energy recovery system 30 may include any or all of the heat exchange loops described above. An example of such a composite system is shown in FIG. 6 and includes each of the previously discussed primary heat exchange loops, 36, 52 and 60, and may include any number of intermediate heat exchange loops. Also shown in FIG. 6 is a hydrogen storage device 72, such as a storage vessel or hydride bed, through which hydrogen gas may be directed through valve assembly 74 when the quantity of hydrogen gas produced by fuel processor 12 exceeds the hydrogen needs of fuel cell stack 14.

The heat, or thermal energy, reservoir 32 described above is presented in further detail in FIGS. 7–11. An example of such a reservoir adapted for use with a single heat exchange loop 80 is shown in FIG. 7. Loop 80 includes output and input streams 82 and 84, and may represent any of the heat exchange loops described herein, such as loops 36, 52 or 60. Also shown in FIG. 7 are conduits 40 and 42 that deliver and (optionally) return fluid from device 16.

Reservoir 32 includes at least one fluid storage vessel 86 in which the heat exchange fluid is stored. A pump assembly 88 includes at least one pump adapted to draw fluid from vessel 86 and transport the fluid through output stream 82. Examples of a suitable vessel include open and closed tanks. The specific construction of the storage vessels and pump assemblies may vary, depending upon the particular heat exchange fluid being used and the intended use of that fluid. For example, water may be stored in closed tanks when it is intended for use as the potable hot water supply for a household or other structure, however, it may be stored in open tanks when it is intended for other applications. Similarly, glycol and glycol-water systems will tend to be stored in closed tanks, and air will is tend to be stored in pressurized tanks. Other examples of vessels that are within the scope of the present invention are pools, saunas, hot tubs and the like. For example, a user's swimming pool may be maintained at a desired heated temperature through the heat recovery system of the present invention without requiring the user to incur the heating bill otherwise required to heat the pool.

In FIG. 8, reservoir 32 is shown including a control system 90. Control system 90 includes a controller 92 that directs the operation of pump assembly 88 responsive to programmed instructions and/or inputs from sensors and user inputs. Controller 92 may be implemented on any suitable digital or analog circuit. Controller 92 communicates with a sensor assembly 94 that monitors such variables as the temperature and fluid level in vessel 86. For example, if the temperature of the fluid within vessel 86 is hotter than a desired temperature, either additional fluid may be added from a supply (not shown), or the rate at which the fluid is recycled may be slowed or stopped to allow the fluid to cool. On the other hand, if the temperature of the fluid is lower than desired, the recycle rate may be increased within acceptable limits, some of the stored fluid may be removed to an external storage unit or supply, etc. Similarly, if there is too little fluid in the tank, the controller can direct additional fluid to be added. The controller may also stop the operation of pump assembly 88 should there be less than a determined minimum level of fluid within vessel 86.

Controller 92 may also receive inputs from sensors and controllers not shown in the Figures. For example, the controller may include a sensor (not shown) that measures the rate of operation of the fuel processor, and adjusts the rate at which fluid is pumped through loop 36 accordingly. Similarly, a sensor may measure the rate of operation of the fuel cell stack and adjust the rate at which fluid is pumped through loop 60 accordingly. As used herein, the control system and associated pump assembly, fluid conduits and/or manifold assembly may be referred to collectively as a delivery system.

In FIG. 9, reservoir 32 is shown adapted for use in the composite heat recovery system shown in FIG. 6. As shown, reservoir 32 includes inputs and outputs 100/102, 104/106 and 108/110 respectively corresponding to loops 36, 52 and 60, as well as conduits 40 and 42 in communication with device 16. Also shown are pump assemblies 112, 114 and 116, which are adapted to pump fluid through loops 36, 52 and 60, respectively.

FIG. 10 is similar to the embodiment of reservoir 32 shown in FIG. 9, except further including the control system 90, including controller 92 and sensor 94 assembly, of FIG. 8.

Figure 11:
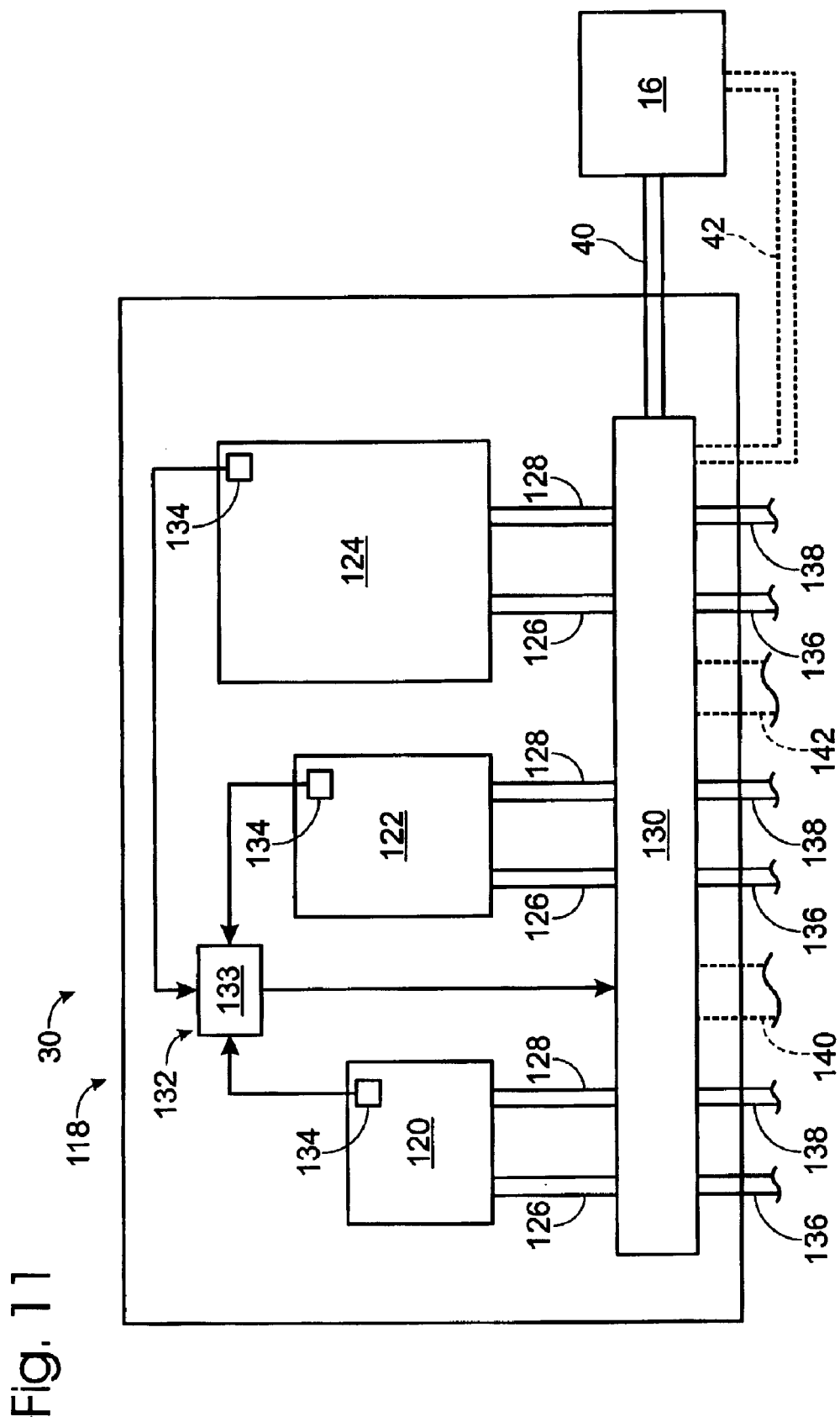
FIG. 11 is a schematic diagram of another embodiment of the thermal energy reservoir of FIG. 6.

As discussed, the reservoir may include one or more vessels for storing heat exchange fluid. An example of such a reservoir is shown in FIG. 11 and indicated generally at 118. As shown, reservoir 118 includes three vessels 120, 122 and 124, from which input and output streams 126 and 128 respectively deliver and remove fluid. It is within the scope of the present invention that more or less vessels than shown in FIG. 11 may be used, and that the vessels may be of the same or different construction and sizes. Similarly, the vessels may each house the same or different heat exchange fluids, and the fluids stored within the vessels may be maintained at the same or different temperatures.

A benefit of having multiple vessels is that the volume of fluid being recycled through the heat recovery system may be controlled depending on the operation of fuel processing system 10. When the system is operating in an idle mode or low-level operating mode, then it will have less recoverable thermal energy than when operating at its maximum state of operation. Therefore, the volume of fluid may be varied, depending upon the desired temperature to which the fluid will be heated and the fuel processing system's ability to supply the required thermal energy.

Reservoir 118 further includes a manifold assembly 130 through which fluid is pumped by a pump assembly from one or more of the vessels and then selectively heat exchanged with any of the sources of thermal energy described herein. The heated fluid from any of the vessels or from the heat exchange loops returning to the manifold assembly can be selectively delivered to device 16, such as through conduits 40 and 42.

The selection of the particular vessel to draw fluid from and the rate at which fluid is drawn from the selected vessel or vessels is controlled by a control system 132, which communicates with the manifold assembly and the pumps assembly associated therewith. Control system 132 includes a controller 133, which communicates with sensor assemblies 134 within each of the vessels, as discussed above with respect to the controller and sensor assembly of FIG. 8.

As shown, manifold 130 includes inputs and outputs 136 and 138 that correspond to the inputs and outputs of the vessels. Alternatively, manifold assembly 130 may include one or more inputs or outputs 140 and 142 through which fluid from more than one vessel may be passed. The latter scenario is most applicable when the vessels contain the same fluid at the same or similar temperatures, while the formal scenario is applicable regardless of the composition or temperature of the fluids within the vessels. It may also be used to mix fluid streams at different temperatures to produce a composite stream at a desired temperature. Similarly, inputs and outputs 140 and 142 may be used to deliver and (optionally) return mixtures of two or more different fluids, with the mix ratio controlled by control system 132.

As an example of the fuel processing system's ability to provide recoverable thermal energy, a fuel cell stack with an electrical power output of approximately 3500 kW will produce approximately 12,000 Btu/hr of usable heat. Therefore, over a twenty-four hour operating period, the heat recovery system could heat 530 gallons of water from approximately 50° F. to approximately 115° F.

The invented thermal energy recovery system and method effectively increase the efficiency of the fuel processing system by recovering and utilizing thermal energy that otherwise would be lost. By using this recovered thermal energy to meet the thermal requirements of the associated device, the energy requirements of the device are reduced. The system also enables the fuel processing system to meet thermal loads that otherwise would be beyond the capacity of the fuel processing system. For example, when the applied thermal and/or electric load exceeds the capacity of the fuel processing system, the thermal energy stored in the reservoir system may be used to satisfy these demands. Similarly, when the fuel processing system is producing more thermal energy than needed by device 16, this excess energy may be stored by the reservoir system to be used when the thermal load increases. Effectively, the reservoir system enables the thermal demands placed upon the fuel processing system to be buffered, or leveled out, as they fluctuate with the demands of device 16.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. For example, the above-described heat exchange loops may include more than one fluid conduit. Similarly, the heat exchangers described herein may include more than one actual heat exchange unit. Applicants regard the subject matter of the invention to include all novel and non-obvious combinations and sub-combinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A system for recovering thermal energy from a fuel processing system, comprising:

a fuel processing system including a fuel processor and a fuel cell stack, wherein the fuel processor is adapted to receive a feedstock and produce a product hydrogen stream therefrom, wherein the fuel cell stack includes a plurality of fuel cells adapted to receive the product hydrogen stream and to produce an electric current therefrom; and a thermal energy recovery system adapted to recover thermal energy from the fuel processing system and including a plurality of thermal energy reservoirs that each are adapted to selectively receive and store a supply of heat exchange fluid and a delivery system adapted to selectively deliver heat exchange fluid from at least one of the plurality of thermal energy reservoirs into thermal communication with the fuel processing system to recover thermal energy therefrom, wherein the recovery system includes a control system with a controller adapted to selectively cause fluid to be drawn from at least one of the plurality of thermal energy reservoirs and delivered into thermal communication with the fuel processing system, and further wherein the recovery system includes a closed heat exchange loop in thermal communication with the plurality of fuel cells and containing heat exchange fluid.

2. The system of claim 1, wherein the controller is further adapted to control the rate at which fluid is drawn from the plurality of reservoirs and selectively delivered to the fuel processing system.

3. The system of claim 2, wherein the controller is adapted to control the rate at which fluid is delivered to the fuel processing system responsive at least in part to the rate of operation of the fuel processor.

4. The system of claim 2, wherein the controller is adapted to control the rate at which fluid is delivered to the fuel processing system responsive at least in part to the rate of operation of the fuel cell stack.

5. The system of claim 1, wherein the system is adapted to selectively draw heat exchange fluid from at least one of the plurality of reservoirs, and further wherein the controller is adapted to control the at least one of the plurality of reservoirs from which fluid is drawn.

6. The system of claim 2, wherein the controller is further adapted to control the rate at which fluid is delivered to at least one thermal energy consuming device in communication with the fuel processing system.

7. The system of claim 2, wherein the controller is adapted to control the rate at which heat exchange fluid is delivered to the fuel processor to maintain the fuel processor within threshold temperatures.

8. The system of claim 7, wherein the delivery system further includes at least one sensor in communication with the controller and adapted to measure the temperature of the fuel processor, and further wherein the controller controls the rate at which heat exchange fluid is delivered to the fuel processor at least in part responsive to inputs from the at least one sensor.

9. The system of claim 5, wherein the delivery system further includes a sensor assembly in communication with the controller and adapted to measure selected variables in the plurality of reservoirs.

10. The system of claim 9, wherein the sensor assembly includes a plurality of sensors adapted to measure the temperature of fluid within the plurality of reservoirs, and further wherein the controller is adapted to selectively add or remove fluid from at least one of the plurality of reservoirs at least in part in response to inputs from the sensor assembly to maintain the temperature of fluid within the plurality of reservoirs within threshold temperatures.

11. The system of claim 9, wherein the sensor assembly includes a plurality of sensors adapted to measure the quantity of fluid within the plurality of reservoirs, and further wherein the controller is adapted to selectively add or remove fluid from at least one of the plurality of reservoirs at least in part in response to inputs from the sensor assembly to maintain the quantity of fluid within the reservoir within threshold volumes.

12. The system of claim 1, wherein the feedstock includes water and at least one of an alcohol and a hydrocarbon, and further wherein the fuel processor is adapted to produce the product hydrogen stream by steam reforming the feedstock.

13. The system of claim 1, wherein the loop includes a plurality of fluid conduits adapted to deliver heat exchange fluid into thermal communication with selected ones of the plurality of fuel cells.

14. The system of claim 13, wherein the plurality of fluid conduits pass between adjacent ones of the plurality of fuel cells.

15. The system of claim 1, wherein the closed heat exchange loop is in thermal communication with a thermal energy reservoir containing a heat exchange fluid adapted to be selectively delivered to at least one thermal energy consuming device.

16. The system of claim 1, wherein the fuel cell stack includes a cathode chamber exhaust, and further wherein the recovery system is further adapted to recover thermal energy from the cathode chamber exhaust.

17. The system of claim 1, wherein the fuel processor includes a combustion region adapted to combust a fuel stream to heat the fuel processor and further wherein the recovery system is adapted to recover thermal energy from the combustion region of the fuel processor.

18. The system of claim 1, wherein the fuel processor includes an exhaust from which an exhaust stream is emitted from the fuel processor, and further wherein the recovery system is adapted to recover thermal energy from the exhaust stream.

19. The system of claim 1, wherein the delivery system is further adapted to selectively recycle at least a portion of the heat exchange fluid to at least one of the thermal energy reservoirs after thermal communication with the fuel processing system.

20. The system of claim 19, wherein the delivery system is further adapted to selectively deliver heat exchange fluid from at least one of the thermal energy reservoirs to at least one thermal energy consuming device.

21. A system for recovering thermal energy from a fuel processing system, comprising:
a fuel processing system including a fuel processor and a fuel cell stack, wherein the fuel processor is adapted to receive a feedstock and produce a product hydrogen stream therefrom, wherein the fuel cell stack includes at least one fuel cell adapted to receive the product hydrogen stream and to produce an electric current therefrom;
at least one energy consuming device adapted to apply a thermal load and an electrical load to the fuel processing system; and
a thermal energy recovery system adapted to recover thermal energy from the fuel processing system and including a plurality of thermal energy reservoirs that each are adapted to selectively receive and store a supply of heat exchange fluid and a delivery system adapted to selectively deliver heat exchange fluid from at least one of the plurality of thermal energy reservoirs into thermal communication with the fuel processing system to recover thermal energy therefrom, wherein the recovery system includes a control system with a controller adapted to selectively cause fluid to be drawn from at least one of the plurality of thermal energy reservoirs and delivered into thermal communication with the at least one thermal energy consuming device, and further wherein the recovery system includes a manifold assembly adapted to selectively draw fluid from at least one of the plurality of thermal energy reservoirs and to deliver the fluid into thermal communication with the at least one thermal energy consuming device, wherein the manifold assembly includes a body and a plurality of inlets adapted to receive selectively heat exchange fluid from the plurality of reservoirs and at least one outlet adapted to deliver the heat exchange fluid into thermal communication with the at least one thermal energy consuming device.

22. The system of claim 21, wherein the controller is further adapted to control the rate at which fluid is delivered to the at least one thermal energy consuming device at least partially in response to the thermal load applied by the device.

23. The system of claim 21, wherein the plurality of reservoirs are adapted to store heat exchange fluid at different temperatures.

24. The system of claim 21, wherein the manifold assembly is adapted to receive and mix heat exchange fluid from more than one of the plurality of reservoirs.

25. The system of claim 24, wherein the system further includes a control system adapted to control the mix ratio of the heat exchange fluid from the more than one of the plurality of reservoirs.

26. The system of claim 21, wherein the plurality of reservoirs includes a first reservoir containing a supply of a first heat exchange fluid, and a second reservoir containing a supply of a second heat exchange fluid.

27. The system of claim 26, wherein the first fluid has a different composition than the second fluid.

28. The system of claim 26, wherein at least one of the first and the second fluids is not water.

29. The system of claim 26, wherein the first fluid is maintained within the first reservoir at a first temperature and the second fluid is maintained within the second reservoir at a second temperature that is different than the first temperature.

30. The system of claim 26, wherein the first reservoir has a different size than the second reservoir.

31. The system of claim 26, wherein the plurality of reservoirs includes at least one reservoir in addition to the first reservoir and the second reservoir.

32. The system of claim 21, wherein the plurality of reservoirs includes at least one open tank and at least one closed tank.

33. The system of claim 32, wherein the plurality of reservoirs includes at least one pressurized tank.

34. The system of claim 21, wherein the plurality of reservoirs includes at least one reservoir selected from the group consisting of swimming pools, saunas and hot tubs.

35. The system of claim 21, wherein the at least one thermal energy consuming device includes a vehicle.

36. The system of claim 21, wherein the at least one thermal energy consuming device includes a household.

37. The system of claim 21, wherein the at least one thermal energy consuming device includes a boat.

38. The system of claim 1, wherein the plurality of reservoirs includes a first reservoir containing a supply of a first heat exchange fluid and a second reservoir containing a supply of a second heat exchange fluid, and further wherein the first fluid has a different composition than the second fluid.

39. The system of claim 1, wherein the plurality of reservoirs includes a first reservoir containing a supply of a first heat exchange fluid and a second reservoir containing a supply of a second heat exchange fluid, and further wherein at least one of the first and the second fluids is not water.

40. The system of claim 38, wherein the first fluid is maintained within the first reservoir at a first temperature and the second fluid is maintained within the second reservoir at a second temperature that is different than the first temperature.

41. The system of claim 1, wherein the plurality of reservoirs includes at least one open tank and at least one closed tank.

42. The system of claim 41, wherein the plurality of reservoirs includes at least one pressurized tank.

43. The system of claim 1, wherein the plurality of reservoirs includes at least one reservoir selected from the group consisting of swimming pools, saunas and hot tubs.

44. The system of claim 12, wherein the plurality of reservoirs includes a first reservoir containing a supply of a first heat exchange fluid and a second reservoir containing a supply of a second heat exchange fluid, and further wherein the first fluid has a different composition than the second fluid.

45. The system of claim 12, wherein the plurality of reservoirs includes a first reservoir containing a supply of a first heat exchange fluid and a second reservoir containing a supply of a second heat exchange fluid, and further wherein at least one of the first and the second fluids is not water.

46. The system of claim 12, wherein the plurality of reservoirs includes at least one reservoir selected from the group consisting of swimming pools, saunas and hot tubs.

47. A system for recovering thermal energy from a fuel processing system, comprising:

a fuel processing system including a fuel processor and a fuel cell stack, wherein the fuel processor is adapted to receive a feedstock and produce a product hydrogen stream therefrom, wherein the fuel cell stack includes at least one fuel cell adapted to receive the product hydrogen stream and to produce an electric current therefrom;

at least one energy consuming device adapted to apply a thermal load and an electrical load to the fuel processing system; and a thermal energy recovery system adapted to recover thermal energy from the fuel processing system and including a plurality of thermal energy reservoirs that each are adapted to selectively receive and store a supply of heat exchange fluid and a delivery system adapted to selectively deliver heat exchange fluid from at least one of the plurality of thermal energy reservoirs into thermal communication with the fuel processing system to recover thermal energy therefrom, wherein the plurality of reservoirs includes a first reservoir containing a supply of a first heat exchange fluid and a second reservoir containing a supply of a second heat exchange fluid, and further wherein the first fluid has a different composition than the second fluid, and further wherein the recovery system includes a control system with a controller adapted to selectively cause fluid to be drawn from at least one of the plurality of thermal energy reservoirs and delivered into thermal communication with the at least one thermal energy consuming device.

48. The system of claim 47, wherein at least one of the first and the second fluids is not water.

49. The system of claim 47, wherein the first fluid is maintained within the first reservoir at a first temperature and the second fluid is maintained within the second reservoir at a second temperature that is different than the first temperature.

50. The system of claim 47, wherein the first reservoir has a different size than the second reservoir.

51. The system of claim 47, wherein the plurality of reservoirs includes at least one reservoir in addition to the first reservoir and the second reservoir.

52. The system of claim 47, wherein the plurality of reservoirs includes at least one open tank and at least one closed tank.

53. The system of claim 47, wherein the plurality of reservoirs includes at least one pressurized tank.

54. The system of claim 47, wherein the plurality of reservoirs includes at least one reservoir selected from the group consisting of swimming pools, saunas and hot tubs.

55. The system of claim 47, wherein the feedstock includes water and at least one of an alcohol and a hydrocarbon, and further wherein the fuel processor is adapted to produce the product hydrogen stream by steam reforming the feedstock.

56. A system for recovering thermal energy from a fuel processing system, comprising:

a fuel processing system including a fuel processor and a fuel cell stack, wherein the fuel processor is adapted to receive a feedstock and produce a product hydrogen stream therefrom, wherein the fuel cell stack includes at least one fuel cell adapted to receive the product hydrogen stream and to produce an electric current therefrom;

at least one energy consuming device adapted to apply a thermal load and an electrical load to the fuel processing system; and a thermal energy recovery system adapted to recover thermal energy from the fuel processing system and including a plurality of thermal energy reservoirs that each are adapted to selectively receive and store a supply of heat exchange fluid and a delivery system adapted to selectively deliver heat exchange fluid from at least one of the plurality of thermal energy reservoirs into thermal communication with the fuel processing system to recover thermal energy therefrom, wherein the plurality of reservoirs includes at least one reservoir selected from the group consisting of swimming pools, saunas and hot tubs, and further wherein the recovery system includes a control system with a controller adapted to selectively cause fluid to be drawn from at least one of the plurality of thermal energy reservoirs and delivered into thermal communication with the at least one thermal energy consuming device.

57. The system of claim 56, wherein the at least one thermal energy consuming device includes a household.

58. The system of claim 56, wherein the at least one thermal energy consuming device includes a boat.

59. The system of claim 56, wherein the feedstock includes water and at least one of an alcohol and a hydrocarbon, and further wherein the fuel processor is adapted to produce the product hydrogen stream by steam reforming the feedstock.

* * * * *